Aug. 20, 1968 T. K. LINDQUIST 3,397,761
FRICTION PLATE EMPLOYING SEPARATOR MEANS
Filed Feb. 10, 1966 2 Sheets-Sheet 1
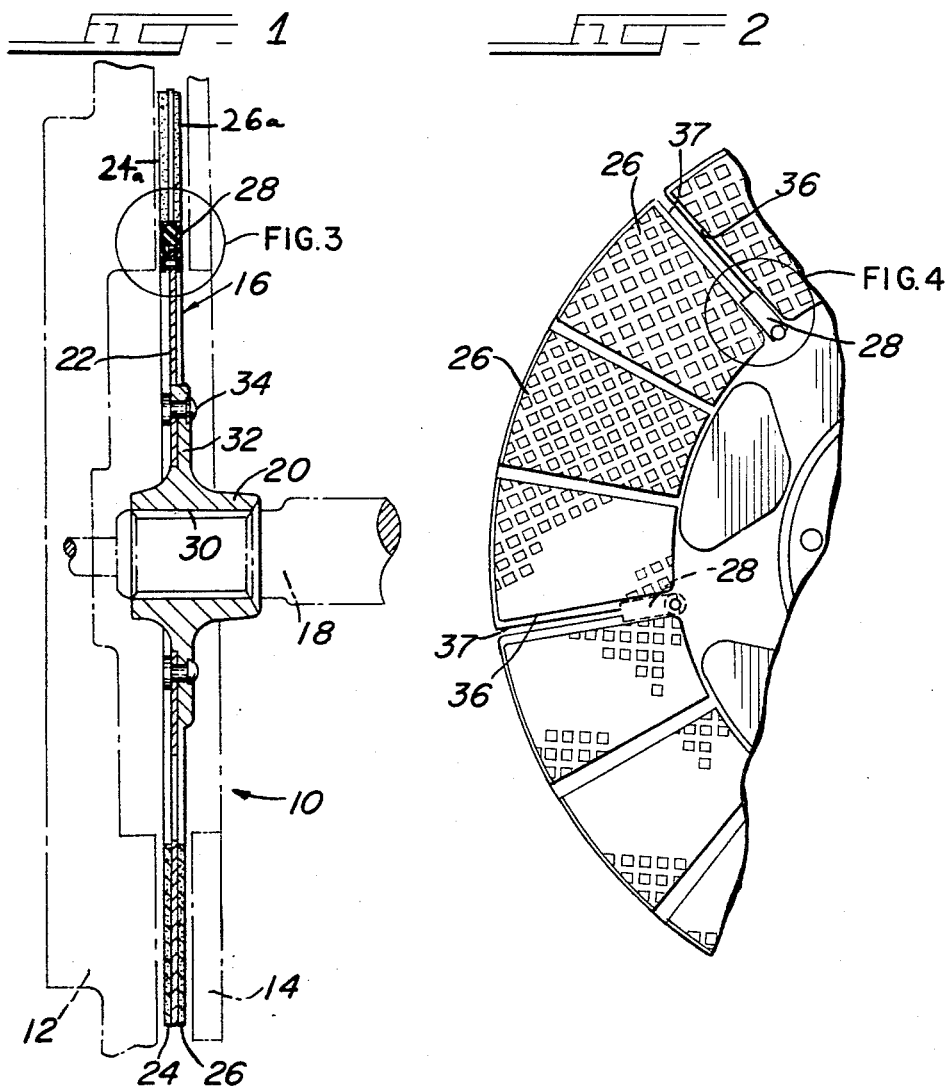
INVENTOR.
TERRY K. LINDQUIST
BY
Joseph W. Mallak Aug. 20, 1968   T. K. LINDQUIST   3,397,761
FRICTION PLATE EMPLOYING SEPARATOR MEANS
Filed Feb. 10, 1966   2 Sheets-Sheet 2
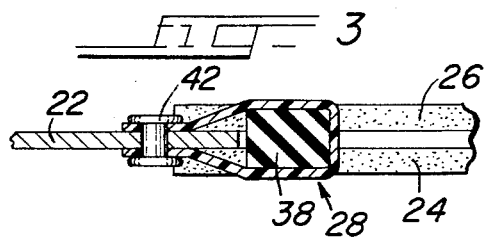
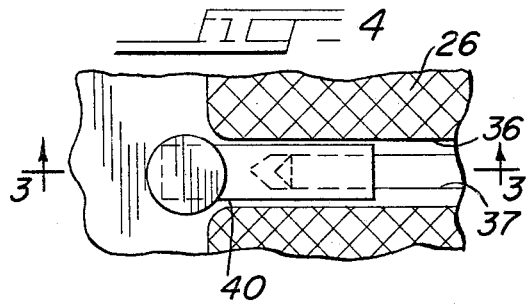
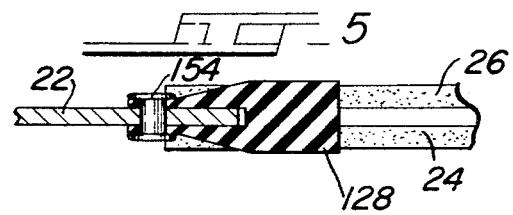
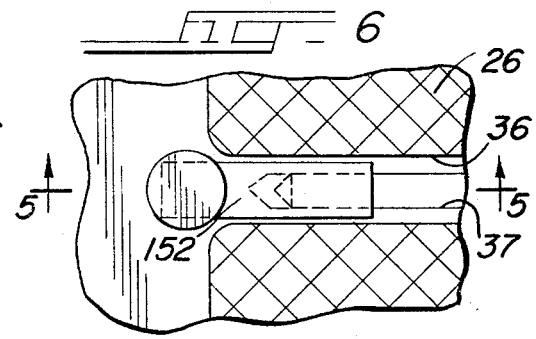
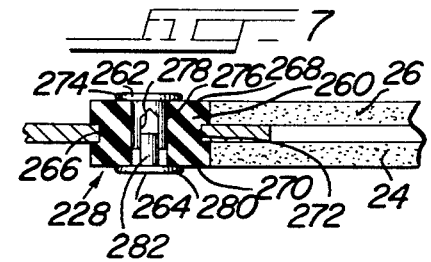
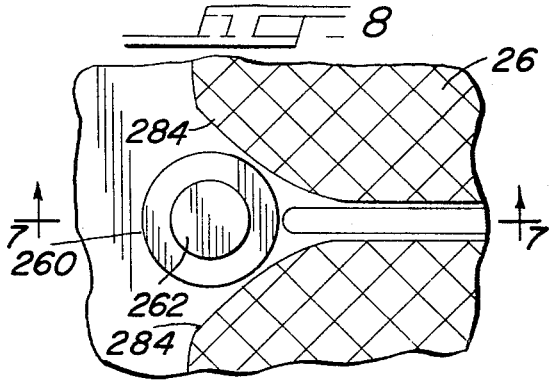
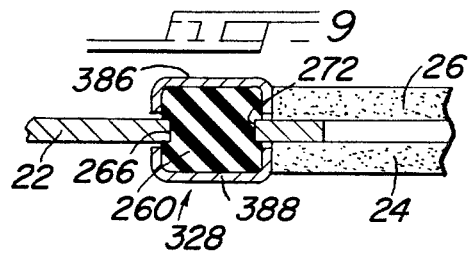
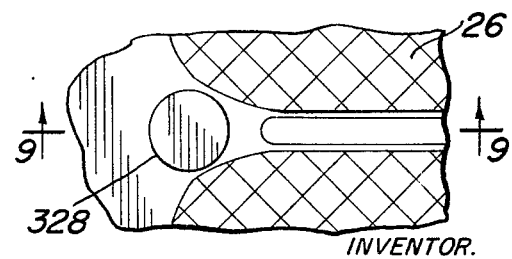
INVENTOR.
TERRY K. LINDQUIST
BY
Joseph W. Malleck United States Patent Office 3,397,761
Patented Aug. 20, 1968

3,397,761
FRICTION PLATE EMPLOYING
SEPARATOR MEANS
Terry K. Lindquist, Crestwood, Ill., assignor to Borg-Warner Corporation, Chicago, Ill., a corporation of Illinois
Filed Feb. 10, 1966, Ser. No. 526,441
1 Claim. (Cl. 192—107)

ABSTRACT OF THE DISCLOSURE

An elastomeric material extends through the driven member of a clutch assembly with surfaces normally extending beyond the radially disposed surface of the friction facing material, such that as the clutch is engaged, the elastomeric material is compressed and as the clutch is disengaged the elastomeric material is effective to provide a separating force between the drive and driven members.

---

This invention relates to friction discs and more particularly to a friction disc incorporating improved means for positively releasing such a disc from engagement with a driving member.

It is desirable in units such as an automotive clutch, for example, that disengagement of the clutch unit be accomplished quickly without any drag. Particularly, in wet clutch systems, the problem of incomplete disengagement is widespread. The symptoms characteristic of the incomplete disengagement as noticed by a consumer in his application would be gear roll or clash when shifting into an unsynchronized gear.

In an automotive clutch installation, for example, including a flywheel, a pressure plate and a driven clutch plate which is brought into engagement with the flywheel and pressure plate, the presence of oil in the clearances between these elements gives rise to a problem of dynamic shear. In other words, the oil itself, between the various members, tends to transmit a small amount of torque. This is accentuated by grooving in the friction disc which tends to make the clutch even more like a fluid coupling. Cold weather also accentuates the problem because it makes the oil very thick thereby increasing its shear carrying capability.

Another cause of incomplete disengagement encountered in wet clutch installations is sometimes referred to as drill block action. In essence, the oil tends to seal the interface of the friction members sufficiently to build up a cohesive force comparable to that encountered when using measurement drill blocks.

In addition, if the engine-drive line is installed at an angle in an automotive vehicle, the axial component of the gravity force may have a tendency to urge a driven clutch plate into engagement with the pressure plate or the flywheel depending on the angle of installation.

Various means have been tried to reduce the tendency for disengaged torque transmission. One group of such attempts might be referred to in a generic sense as the integral plate spring method. For example, so-called full segment bending has been used. Each of the segments or friction pads of the clutch disc body is bent a slight amount at the outer periphery, about .030 of an inch, for example, either toward or away the flywheel to push it away from the flywheel surface upon a releasing movement of the pressure plate. While this method would produce the necessary force to assure disengagement the bend would have to be controlled. Since the bend would be a rather large radius, control of this aspect during manufacture presents some problem, and the problem is particularly acute when the bending operation is to be performed on clutch discs made of high carbon steel.

This method proved to be impractical from a manufacturing standpoint.

The integral plate spring method is illustrated, for example, by the U.S. Patent 2,856,049 to H. O. Schjolin issued Oct. 14, 1958 and another U.S Patent 3,174,602 to Schjolin issued Mar. 23, 1965. In addition to the undesirability of the spring members being formed from the clutch disc itself, it may be observed that a considerable amount of friction material is cut away to provide space for the spring members with a consequent reduction in torque capacity, and an increase in unit loading, consequently increasing wear.

Another method that was tried and discarded was that of bending the clutch plate into a dish shape on the order of a Belleville spring. Manufacturing problems again made this method impractical. In addition, it must be recognized that the clearance between the clutch plate and a pressure plate on one side and the clutch plate and a flywheel on the other side when the clutch is disengaged is quite small. Thus the dish shape bend of the plate could not be so large that the O.D. of the friction elements at one interface, (at the pressure plate, for example) and the I.D. of the friction elements at the other interface, (at the flywheel, for example) would make contact simultaneously when the pressure plate is completely disengaged.

It is, therefore, an object of the invention to provide a friction disc or plate which incorporates means for effecting a rapid disengagement of the friction plate from associated members with a minimum of drag.

A further object is to incorporate in a friction disc or plate resilient spring means for effecting rapid and complete disengagement of the friction plate from associated members.

Another object is to provide a friction plate wherein the means used to effect rapid and complete disengagement from associated members will produce only a minimum torque as a result of its separating force.

Another object is to provide a friction plate wherein the means for effecting rapid disengagement from associated members are resilient elements of a rubber-like material which are attached to the friction plate.

A further object is to provide a friction plate in accordance with the preceding objects which is easy to manufacture.

The above and other objects and advantages of the invention will be more readily apparent when read in connection with the accompanying drawings in which:

FIGURE 1 is a side view in elevation of a clutch plate embodying the invention shown in a disengaged position between a flywheel and a pressure plate;

FIGURE 2 is a plan view of a portion of the clutch plate shown in FIGURE 1;

FIGURE 3 is an enlarged partial view in section of a portion of a clutch plate and taken along line 3—3 of FIGURE 4 illustrating a first embodiment of a friction plate resilient disengaging member;

FIGURE 4 is an enlarged partial plan view of a portion of a clutch plate of the type shown in FIGURE 2 including a first embodiment of the invention;

FIGURE 5 is an enlarged partial view in section of a portion of a clutch plate and taken along line 5—5 of FIGURE 6 illustrating a second embodiment of a friction plate resilient disengaging member;

FIGURE 6 is an enlarged partial plan view of a portion of a clutch plate of the type shown in FIGURE 2 including a second embodiment of the invention;

FIGURE 7 is an enlarged partial view in section of a portion of a clutch plate and taken along line 7—7 of FIGURE 8 illustrating a third embodiment of a friction plate resilient disengaging member;

FIGURE 8 is an enlarged partial plan view of a portion of a clutch plate of the type shown in FIGURE 2 including a third embodiment of the invention;

FIGURE 9 is an enlarged partial view in section of a portion of a clutch plate and taken along line 9—9 of FIGURE 10 illustrating a fourth embodiment of a friction plate resilient disengaging member.

FIGURE 10 is a partial plan view of a portion of a clutch plate of the type shown in FIGURE 9.

Referring now to the drawings wherein like reference characters in the different figures are used to designate the same parts 10 designates generally a clutch unit to transmit drive from a driving member to a driven member.

The clutch unit 10 comprises a flywheel 12 connected to and rotatably driven by a prime mover (not shown) such as an automotive engine. The unit 10 also comprises a pressure plate 14 adapted to be actuated in a normal manner. A unit such as that shown in FIGURE 1 may also include a clutch cover plate (not shown) which may be attached to the flywheel 12 by bolts or other suitable means so that it may rotate with the flywheel. Such a construction is shown, for example, in the U.S. Patent 3,167,163 to Smirl et al. issued Jan. 26, 1965. That type of a unit may utilize a clutch plate embodying the invention disclosed herein. The unit 10 also comprises a clutch plate assembly 16 which is slidably mounted on a driven shaft 18.

The clutch plate assembly 16 comprises a hub member 20, an annular clutch plate or disc 22 supported on the hub member 20, a plurality friction elements 24 and 26 and a plurality of disengaging members 28.

The hub member 20 is formed with internal splines 30 and is slidingly supported on complementary portions on the driven shaft 18, the hub member being disposed for axial movement on the shaft 18.

The annular clutch plate or disc 22 is a flat plate with an opening at its center to receive the hub 20. It is secured to a radially extending flange 32 on the hub 20 by a suitable means such as rivets 34.

Friction elements 24 and 26 are secured to opposite sides of the clutch plate 22 at the outer periphery thereof. The friction elements in the embodiment illustrated are in the form of arcuate segments which are spaced from each other circumferentially to define channels 36 between adjacent segments. When a clutch plate assembly of this type is used in a wet clutch the channels 36 are effective to promote the flow of oil to dissipate the heat of friction created during operation of the clutch. Slots 37 may be formed in the clutch plate 22 in registry with the channels 36.

The clutch plate assembly 16 also comprises a plurality of disengaging members circumferentially spaced around the clutch plate. These members are resilient and have a spring action. The purpose of these resilient members is to effect a quick and positive disengagement of the clutch, that is, to eliminate or neutralize, insofar as it is possible, all undesirable conditions which tend to prevent complete disengagement.

Resilient metal members to accomplish this purpose are disclosed in my co-pending application for U.S. Letters Patent, Ser. No. 526,554, filed Feb. 10, 1966. The disengaging resilient members disclosed in this application comprise basically a rubber-like material which may include, for example, rubber and various synthetic elastomeric products.

A first embodiment of a disengaging member 28 is shown in FIGURES 3 and 4. The disengaging member 28 comprises a rubber-like material portion 38 partially encased by a thin flexible metallic or manufactured material such as Teflon cover 40. The cover 40 is in the form of a strip which is folded over the material 38 so that the two ends of the cover 40 may be attached to each side of the disc 22 by suitable means such as a rivet 42. The rubber-like material 38 may be in the form of a block or bar which extends axially through the slots 37 and into the channels 36. As best seen in FIGURE 2 the members 28 as a whole are substantially radially directed to extend into the channels 36. In its uncompressed state the member 28 extends beyond the faces of the friction elements 24 and 26. The member 28 is secured to the clutch disc 22 at a position inwardly of the I.D. of the friction facing so that the body of the member 28 which will contact an adjacent member such as a flywheel or a pressure plate is positioned close to the I.D. of the friction facing. This positioning is important in order to minimize the torque exerted by the expanding force of the member 28.

As used herein, rubber-like material is meant to include any kind of material such as rubber or various elastomeric products which have resilient characteristics and are able to withstand numerous flexing movements over a long period of time. In addition, the material must be able to withstand continuous submersion in hot oil over a long period of time.

In a friction plate of the type illustrated it is contemplated that six circumferentially spaced disengaging members 28 might be used, but a greater or lesser number could be used depending on the application.

In operation when the clutch is to be engaged the pressure plate 14 would be moved to the left as viewed in FIGURE 1 to clamp the friction elements 24 and 26 between the pressure plate 14 and the flywheel 12. This squeezes the disengaging members 28 into their respective channels 36. This flattens them out into a position no greater than the thickness of the friction elements under compression. As soon as the pressure plate is released the disengaging members 28 will become rapidly unflexed and assume their original disposition extending axially beyond the faces of each of the friction facings 24 and 26. In doing so, they will unflex to position the friction plate substantially in the center of the space between the pressure plate 14 and the flywheel 12 leaving a definite clearance between the friction elements 24 and 26 and the adjacent members, the flywheel 12 and pressure plate 14.

The disengaging members are particularly useful in a wet clutch where the cohesive force between the friction elements and the adjacent members must be overcome. This cohesive force is one of the main forces tending to prevent complete and rapid disengagement, and the disengaging members must store enough energy to overcome this cohesive force upon disengagement.

A second embodiment of a disengaging member is shown in FIGURES 5 and 6 and is indicated by numeral 128. The member 128 comprises a molded or extended shape of resilient rubber-like material secured to each side of the clutch disc 22 by suitable means such as a rivet 154. The rubber-like material may be of the same type as that used to form the block 38 of the member 28 shown in FIGURES 3 and 4. The shape 128 is secured to the clutch disc 22 inwardly of the I.D. of the friction elements 24 and 26 so that the body of the shape lies within the channels 36 formed between the friction elements and within the groove 37 in the disc. It will be observed from FIGURE 5 that in their uncompressed form the shape 128 also extends axially beyond the faces of the friction elements 24 and 26 to hold the friction elements out of engagement with the pressure plate and flywheel. Then when the friction elements are engaged by the flywheel 12 and the pressure plate 14, the shape 128 is compressed into the channels 36. The portion of the shape 128 which protrudes or extends beyond the face of the friction elements is also positioned close to the I.D. of the friction elements. As previously explained in connection with the first embodiment of FIGURES 3 and 4, this is important in order to minimize the torque exerted by the separating force of the resilient shape 128.

A third form of disengaging member indicated by reference numeral 228 is shown in FIGURES 7 and 8. The member 228 comprises a substantially circular block 260 of resilient rubber-like material and a pair of telescoping rivet-like members 262 and 264 positioned in and projecting from each side of the block 260. The block 260 has a groove 266 formed on the periphery thereof midway between the faces 268 and 270 of the block. The block 260 is received in an opening 272 in the clutch disc, the edge of the opening 272 being received in the groove 266 to hold the block of rubber-like material in place. The block 260 may be substantially as thick as the total thickness of the clutch disc and the friction elements on each side thereof. The block 260 may be made of resilient material such as that used in member 38 shown in FIGURES 3 and 4.

The telescoping rivet-like member 262 comprises a flat head portion 274 and a body portion 276 having a longitudinally extending bore 278 formed therein. The complementary telescoping member 264 comprises a flat head portion 280 and a stem portion 282 adapted to be slidingly received in the bore 278 of the member 262. Suitable means is provided to retain the members 262 and 264 in the block 260, such, for example, as bonding the underside of the head portion 274 and 280 to the block 260. The head portions 274 and 280 are adapted to contact the adjacent pressure plate and flywheel. When the resilient block is in its uncompressed state the head portions 274 and 280, of course, extend beyond the faces of the friction elements to hold the latter out of engagement with the flywheel and pressure plate. Furthermore, the block 260 is so positioned with respect to the clutch disc 22 that the friction plate is effectively centered in the gap between the pressure plate and flywheel. From FIGURE 8 it will be observed that the disengaging member 228 just like the previously described disengaging members 28 and 128 is positioned close to the I.D. of the friction elements to minimize the torque exerted by the separating force of the resilient member 228. Parts of the inner edge of the friction elements 24 and 26 may be cut away to define recesses 284 to accommodate the disengaging members 228 at the I.D. of the friction elements. It is apparent from FIGURE 7 that during engagement of the pressure plate and flywheel with the friction elements 26 and 24 the telescoping arrangement of the members 262 and 264 will permit compression of the resilient rubber-like block 260 and that when disengagement is desired the head portions 274 and 280 under the influence of the resilient block portion 260 will urge the friction plate out of engagement with the flywheel and pressure plate.

A fourth form of disengaging member indicated by reference numeral 328 is shown in FIGURES 9 and 10. The member 328 is much the same as the member 228 shown in FIGURES 7 and 8. The primary difference is that instead of telescoping rivet-like members projecting through a block of resilient material, thin metallic covers 386 and 388 are attached to the outer faces of the resilient rubber-like block member 260, being attached thereto by bonding or other suitable means.

Thus I have advantageously provided an improved clutch plate which can be positively disengaged from its adjacent contacting members. Furthermore, the disengaging members are also effective to prevent preliminary engagement, that is, when the pressure plate is moved to a clutch engaging position torque transmission will commence only when there is positive contact between the friction elements and adjacent members. The provision of independent disengaging members rather than disengaging members which are made from the clutch disc itself permits full attention to the function of the disengaging members in their design. The use of resilient rubber-like disengaging members is inexpensive and the manufacturing control in making suitable resilient members from a rubber-like material is not critical.

While certain embodiments of the invention have been specifically disclosed, it is to be understood that the invention is not limited thereto as other variations will be readily apparent to those skilled in the art and the invention is to be given its fullest possible interpretation within the terms of the following claim.

It is claimed:

1. A friction plate for use in a device as a disc brake or a disc clutch, said plate comprising: a supporting disc member adapted for rotation about a generally central axis thereof; friction material carried by said disc and presenting at least one radially directed surface for engagement, at least one resilient block mounted on said disc member presenting opposite sides which, in the unstressed condition, extend axially beyond the radially disposed surface extremities of said friction material or disc member whereby said block may serve to provide a resilient separation force against adjacent members and yet may be selectively compressed by an external positive engagement force so that contact may be made with said friction material and means associated with each of said opposite sides presenting a low coefficient of friction material for engaging said adjacent members, in which said low coefficient of friction material comprises a strip of metal formed into a loop having two ends, said two ends being secured to opposite sides of said disc member and said block being disposed within said loop.

References Cited

UNITED STATES PATENTS

| 1,821,335 | 9/1931 | Beal | 192—107 |
| 2,523,501 | 9/1950 | Davies et al. | 192—69 |
| 2,856,049 | 10/1958 | Schjolin | 192—107 |
| 3,245,508 | 5/1966 | Livezey | 192—55 X |

FOREIGN PATENTS

| 269,696 | 4/1927 | Great Britain. |
| 614,913 | 3/1946 | Great Britain. |

BENJAMIN W. WYCHE, III, *Primary Examiner.*